United States Patent
Albanese et al.

(10) Patent No.: US 9,800,509 B2
(45) Date of Patent: Oct. 24, 2017

(54) SYSTEM AND METHOD FOR EFFICIENT TRANSPORT OF LARGE DATA FILES

(71) Applicant: UVic Industry Partnerships Inc., Victoria (CA)

(72) Inventors: Ilijc Albanese, Victoria (CA); Thomas E. Darcie, Victoria (CA); Sudhakar Ganti, Victoria (CA); Stephen W. Neville, Victoria (CA); Yagiz O. Yazir, Victoria (CA)

(73) Assignee: UVic Industry Partnerships Inc., Victoria (CA)

( * ) Notice: Subject to any disclaimer, the term of this patent is extended or adjusted under 35 U.S.C. 154(b) by 210 days.

(21) Appl. No.: 14/628,102

(22) Filed: Feb. 20, 2015

(65) Prior Publication Data

US 2015/0236957 A1 Aug. 20, 2015

Related U.S. Application Data

(60) Provisional application No. 61/942,552, filed on Feb. 20, 2014.

(51) Int. Cl.
| | |
|---|---|
| *H04L 12/815* | (2013.01) |
| *H04L 12/801* | (2013.01) |
| *H04L 12/64* | (2006.01) |
| *H04L 12/805* | (2013.01) |
| *H04L 12/835* | (2013.01) |

(52) U.S. Cl.
CPC .......... *H04L 47/22* (2013.01); *H04L 12/6418* (2013.01); *H04L 47/193* (2013.01); *H04L 47/30* (2013.01); *H04L 47/36* (2013.01)

(58) Field of Classification Search
CPC .... H04L 47/22; H04L 12/6418; H04L 47/193
USPC .......................................................... 370/235
See application file for complete search history.

(56) References Cited

U.S. PATENT DOCUMENTS

| | | | | |
|---|---|---|---|---|
| 4,571,671 | A * | 2/1986 | Burns | G06F 13/282 710/35 |
| 6,044,061 | A * | 3/2000 | Aybay | H04L 49/1576 370/230 |
| 6,233,226 | B1 * | 5/2001 | Gringeri | H04L 12/6418 348/700 |
| 7,006,438 | B2 * | 2/2006 | West | H04L 12/5601 370/231 |

(Continued)

OTHER PUBLICATIONS

IEEE Computer Society, "IEEE Standard for Ethernet," IEEE Standards Association, IEEE Std 802.3™-2012, Section 6, Dec. 28, 2012.

(Continued)

*Primary Examiner* — Stephen J Clawson
(74) *Attorney, Agent, or Firm* — Klarquist Sparkman, LLP (57) ABSTRACT

Telecommunication networks are under stress due to rapid traffic increase cause mostly by large file transfers. Disclosed herein is a cross-layer transport protocol specifically designed to efficiently handle large transactions. Traffic generated from large transactions is shaped into a periodic succession of fixed-size data frames. Each transaction can then be scheduled for transmission using a two-way reservation protocol. Exemplary results show that the proposed approach is capable of significantly improving goodput and end-to-end delay relative to TCP, improving efficiency of bandwidth utilization by over 40%.

16 Claims, 11 Drawing Sheets

(56) References Cited

U.S. PATENT DOCUMENTS

| | | | | | |
|---|---|---|---|---|---|
| 7,035,220 | B1* | 4/2006 | Simcoe | ................... | H04L 47/10 370/236 |
| 7,039,013 | B2* | 5/2006 | Ruutu | ................... | H04L 47/762 370/235 |
| 7,298,728 | B2* | 11/2007 | Golla | ................... | H04B 7/2045 370/337 |
| 8,542,585 | B2* | 9/2013 | McDaniel | ........... | H04L 12/5693 370/230 |
| 9,419,902 | B1* | 8/2016 | Sites | ....................... | H04L 47/18 |
| 2003/0016630 | A1* | 1/2003 | Vega-Garcia | ........... | H04L 29/06 370/252 |
| 2004/0190459 | A1* | 9/2004 | Ueda | ...................... | H04L 47/10 370/252 |
| 2005/0232150 | A1* | 10/2005 | Nishimura | ............. | H04L 47/215 370/230 |
| 2007/0002823 | A1* | 1/2007 | Skov Andersen | ... | H04B 7/2656 370/349 |
| 2009/0207859 | A1* | 8/2009 | Beshai | ................ | H04L 12/5695 370/474 |
| 2012/0155476 | A1* | 6/2012 | Pavani | .................. | H04J 3/0658 370/400 |
| 2012/0278446 | A1 | 11/2012 | Darcie et al. | | |
| 2013/0188568 | A1* | 7/2013 | Kuo | .................. | H04W 52/0212 370/329 |
| 2013/0201826 | A1* | 8/2013 | Testa | ....................... | H04L 47/10 370/230 |

OTHER PUBLICATIONS http://omnetpp.org/, retrieved Jul. 18, 2015 (4 pages).
International Telecommunication Union, "Generic Framing Procedure," ITU-T G.7041, Apr. 2011 (100 pages).
International Telecommunication Union, "Hitless adjustments of ODUflex (GFP)," ITU-T G.7044, Oct. 2011 (44 pages).
International Telecommunication Union, "Interfaces for the optical transport network," ITU-T G.709, Feb. 2012 (260 pages).
International Telecommunication Union, "Architecture of optical transport networks," ITU-T G.872, Oct. 2012 (64 pages).
Marcon et al., "The local and global effects on traffic shaping in the internet," *Communication Systems and Networks (COMSNETS)*, Third International Conference, 1(10):4-8, Jan. 2011.
Xia et al., "High-Capacity Optical Transport Networks," *IEEE Communication Magazine*, 50(11):170-178, Nov. 2012.
Zhang et al., "On Architecture Design, Congestion Notification, TCP Incast and Power Consumption in Data Centers," *Communications Surveys and Tutorials, IEEE* 15(1):39-64, Jan. 11, 2012.
Abts et al., "A Guided Tour through Data-center Networking," *Networks*, vol. 10, No. 5, May 2012 (14 pages).
Ballani et al., "Towards Predictable Datacenter Networks," *SIGCOMM Comput. Commun. Rev.* 41(4):242-253, Aug. 2011.
Casetti et al., "TC Westood: End-to-End Congestion Control for Wired/Wireless Networks," *Wireless Networks* 8(5):467-479, Sep. 2002.
Chen et al., "Understanding TCP Incast Throughput Collapse in Datacenter Networks," *Proceedings of the 1st ACM workshop on Research on Enterprise Networking (WREN '09)*, New York, New York, pp. 73-82, Aug. 2009.
Cisco, "Cisco Visual Networking Index: Forecast and Methodology, 2012-2017," May 29, 2014, White Paper retrieved Oct. 20, 2013 from: http://www.cisco.com/en/US/solutions/collateral/ns341/ns525/ns537/ns705/ns827/white_paper_c11481360.pdf (10 pages).
Engel et al., "Quantitative Analysis of Network Architectures for Future National Optic Transport Networks (OTN)," 2010 ITG Symposium on Photonic Networks, *Photonische Netze*, May 4, 2010 (7 pages).
Floyd et al., "Random early detection gateways for congestion avoidance," *IEEE/ACM Transactions on Networking*, 1(4):397-413, Aug. 1993.
Gorshe, "A Tutorial on ITU-T G.709 Optical Transport Networks (OTN)," *PMC-Sierra white paper*, Issue No. 2, Jun. 2011 (110 pages, submitted as 2 parts).
Gumaste et al., "Proliferation of the optical transport network: a use case based study," *IEEE Communications Magazine* 48:54-61, Sep. 2010.
Hutcheon, "OTN to Enable Flexible Networks," *Optical Fiber Communication Conference and Exposition (OFC/NFOEC)*, Mar. 2011 (3 pages).
IEEE Computer Society, "IEEE Standard for Ethernet," IEEE Standards Association, IEEE Std 802.3™-2012, Section 1, Dec. 28, 2012.
IEEE Computer Society, "IEEE Standard for Ethernet," IEEE Standards Association, IEEE Std 802.3™-2012, Section 2, Dec. 28, 2012.
IEEE Computer Society, "IEEE Standard for Ethernet," IEEE Standards Association, IEEE Std 802.3™-2012, Section 3, Dec. 28, 2012.
IEEE Computer Society, "IEEE Standard for Ethernet," IEEE Standards Association, IEEE Std 802.3™-2012, Section 4, Dec. 28, 2012.
IEEE Computer Society, "IEEE Standard for Ethernet," IEEE Standards Association, IEEE Std 802.3™-2012, Section 5, Dec. 28, 2012.
IEEE Computer Society, "IEEE Standard for Management Information Base (MIB) Definitions for Ethernet," IEEE Standards Association, IEEE Std 802.3.1™-2013, A 2013.
IEEE Computer Society, "IEEE Standard for Ethernet, Amendment 1: Physical Layer Specifications and Management Parameters for Extended Ethernet Passive Optical Networks," IEEE Standards Association, IEEE Std 802.3bk™-2013, Aug. 2013.
IEEE Computer Society, "IEEE Standard for Ethernet, Amendment 2: Physical Layer Specifications and Management Parameters for 100 Gb/s Operation Over Backplanes and Copper Cables," IEEE Standards Association, IEEE Std 802.3bj™-2014, Aug. 2014.

* cited by examiner

SYSTEM AND METHOD FOR EFFICIENT TRANSPORT OF LARGE DATA FILES

CROSS REFERENCE TO RELATED APPLICATION

This application claims the benefit of U.S. Provisional Patent Application No. 61/942,552, filed Feb. 20, 2014, which is incorporated herein by reference in its entirety.

FIELD

The present disclosure relates to networking and the future evolution of the Internet, where increased efficiency and decreased power consumption can be achieved through an overlay network specifically designed to handle very large data packets that are representative of present-day and future large file transactions.

BACKGROUND

Telecommunication networks are experiencing continued rapid traffic increase mostly driven by the proliferation of bandwidth-intensive applications. Unfortunately, the revenues for network operators are not growing at the same pace. To continue supporting the growth of Internet-based applications in an economically viable manner, the industry must reduce the cost per bit transported and increase capacity. While increasing the deployed capacity is costly, improving traffic grooming and shaping becomes important to better utilize the capacity provided. Traffic shaping policies are often used by ISPs to limit bandwidth costs especially when it comes to bulk data transfers. In spite of their widespread use, such policies often lead to significant end-to-end performance losses. Furthermore, constrained by traditional protocols such as TCP and UDP, the increasing proportion of large file transactions (e.g. VoD, IPTV, CDN content update and distribution and so on), places an increasing burden on the network hardware and capacity of current IP networks.

In the increasingly important Data Center (DC) environment, efficient intra-DC and inter-DC networks play a crucial role in minimizing congestion and conserving computational resources. These networks must provide predictable performance for diverse and unpredictable load conditions. Managing this unpredictability generally translates into inefficiency in the use of transport resources such that associated transport costs become appreciable, particularly for wide-area inter-DC networks. In this context, a network that is able to provide predictable network performance for random traffic patterns would be a desirable feature.

In parallel, recent standardization of transport architectures such as ITU-T G.709/G.872 Optical Transport Network (OTN) has provided a key step towards a more flexible and efficient transport infrastructure layer, enabling protocol agnostic transport services, allowing a more efficient use of deployed capacity and simplifying management operations. This widely deployed standard provides well-defined mappings of most existing and future higher layer formats into a common underlying transport layer.

SUMMARY

Disclosed herein are embodiments of a method for transporting a data file, comprising dividing the data file into a plurality of data frames; concatenating the plurality of data frames into at least one chain with a predefined transparency degree; associating the at least one chain with a control packet comprising information regarding at least a chain length of the at least one chain and the predefined transparency degree; scheduling transmission of the at least one chain along a predetermined path of a network based on the control packet; and transmitting each data frame along the predetermined path at a time derived from an estimated time-to-transmit parameter. In some embodiments, the method can further comprise concatenating the plurality of data frames into the at least one chain with one or more void frames.

Dividing the data file into a plurality of data frames can comprise determining data frame sizes based on a transport technology. For example, the data frame size can be selected such that mapping onto a transport layer is as seamless as possible. In some embodiments, the method can further comprise using a buffer having a buffer size proportional to a data frame size and a chain confirmation, such as a transparency degree and frame size of the at least one chain, to delay the at least one chain so as to interleave the at least one chain with a previously received chain or an incoming chain.

The maximum buffer size can be selected based a maximum data frame size and maximum transparency degree allowed for a chain. In some embodiments, the data file has a size of at least 100 MB.

The predefined transparency degree of the at least one chain is associated with a number of periods of the at least one chain having at least one timeslot occupied by at least one data frame and in some embodiments, the predefined transparency degree is associated with a number of void frames in the at least one chain.

The estimated time-to-transmit parameter can be included in the control packet and can be communicated to at least one node of the predetermined path and is associated with a delay between control packet arrival and chain reception commencement.

Also disclosed herein are embodiments of a system for transporting a data file, comprising at least one source server comprising a software module configured to: divide the data file into a plurality of data frames; concatenate the plurality of data frames into at least one chain with a predefined transparency degree; and associate the at least one chain with a control packet comprising information regarding at least a chain length of the at least one chain and the predefined transparency degree. In some embodiments, the software module can be further configured to schedule transmission of the at least one chain along a predetermined path of a network based on the control packet and transmit each data frame along the predetermined path at a time derived from an estimated time-to-transmit parameter.

In some embodiments of the systems, the at least one chain further comprises one or more void frames. The plurality of data frames can comprise data frames of different sizes. Also, the predefined transparency degree of the at least one chain can be associated with a number of periods of the at least one chain comprising at least one timeslot occupied by at least one data frame. In some embodiments, the predefined transparency degree is associated with a number of void frames in the at least one chain. The estimated time-to-transmit parameter can be included in the control packet and can be communicated to at least one node of the predetermined path and is associated with a delay between control packet arrival and chain reception commencement. In some embodiments, the system includes a network interface that communicates the at least one chain and wherein the network interface is an optical transport network or an Ethernet-based network.

Also disclosed herein are embodiments of a network node, comprising a network interface configured to receive at least one chain that includes a plurality of data frames and void frames, or a portion of the at least one chain, wherein the network node transmits an updated estimated time-to-transmit parameter to a destination network. The network interface can be configured to receive a control packet associated with the at least one chain and can be configured to extract an estimated time-to-transmit parameter from the control packet. The updated estimated time-to-transmit parameter can be determined by adding an original estimated time-to-transmit parameter of the network node to an original buffering time of the network node and subtracting an estimated control packet processing time for the network node.

The foregoing and other objects, features, and advantages of the claimed invention will become more apparent from the following detailed description, which proceeds with reference to the accompanying figures.

DETAILED DESCRIPTION

I. Explanation of Terms

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

II. Introduction

Bandwidth demand is increasingly dominated by large transactions. The present disclosure concerns embodiments of a method and system useful for a networking approach wherein large file transactions are handled separately from the large number of smaller transactions. Traffic shaping can then be used to improve link utilization and reduce the computational load placed on the network. Traffic shaping for the corresponding long hold times can benefit from a far less dynamic traffic mix. In what follows, large transactions are shaped into periodic concatenations of data frames which are scheduled for transmission over an end-to-end path using a lightweight scheduling protocol. This Big File Protocol (BFP) shapes each transaction prior to transmission and executes the scheduling procedure on a per-flow basis. BFP creates a tighter linkage (than TCP/UDP) between the application layer and resource availability at the physical layer (either Ethernet or OTN), made possible by the long push times of long file transfers. This approach does not require network-wide coordination. Also, the disclosed methods and systems can be implemented over any packet switched network, and are entirely compatible with the current OTN infrastructure as well as with Ethernet-based networks, which are commonly used in data-center environments. The disclosed methods and systems are able to overcome the limitations of traffic shaping on end-to-end performance of the network while allowing a more efficient utilization of network resources, and a significant increase in goodput (>40%), potentially reducing the cost per bit.

III. Methods and Systems

The big file protocol disclosed herein is a cross-layer transport protocol designed to handle large transactions (e.g. 100 MB) in a more efficient manner by shaping traffic and leveraging currently available transport layer functionalities to enable a better use of the deployed capacity and reduce the computational load placed on the network by large transactions. The nodes implementing BFP shape traffic from each transaction into periodic, semitransparent concatenations of fixed-size data frames, referred to as chains henceforth.

Figure 1:
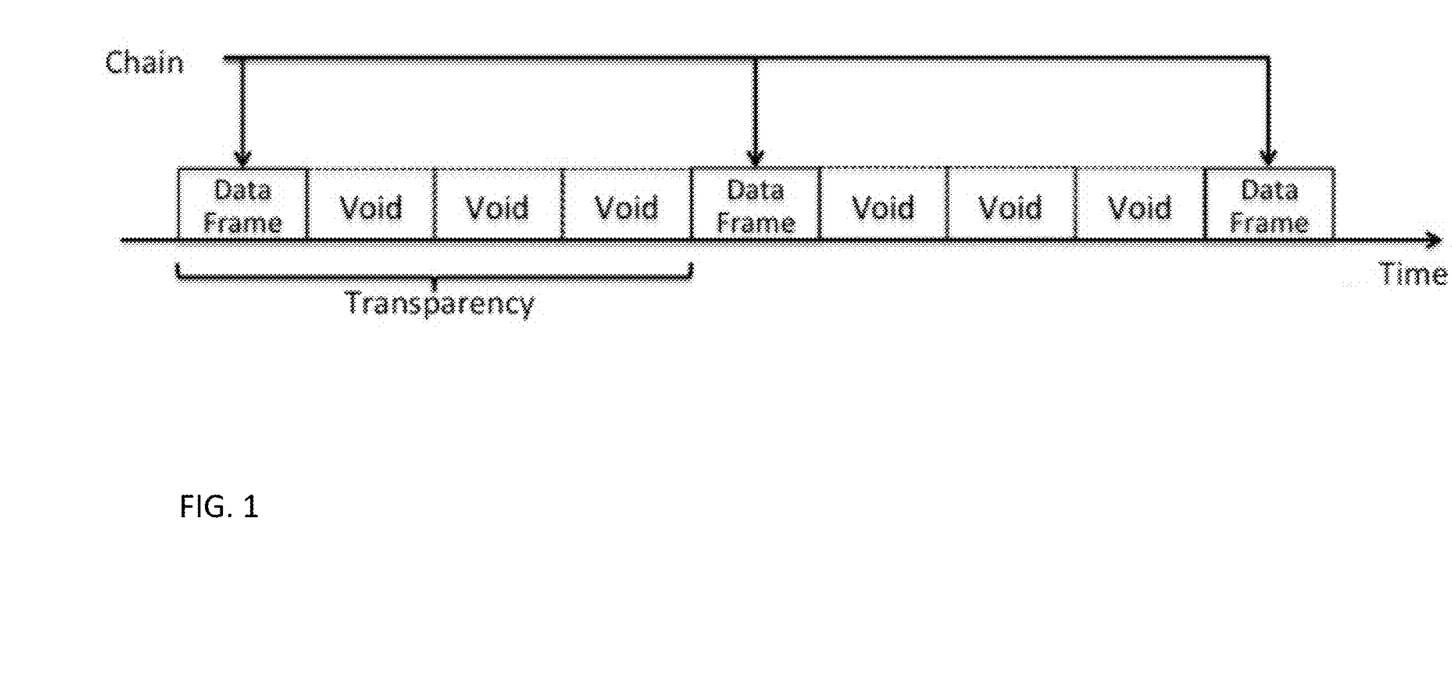
FIG. 1 illustrates a data transaction organized into a chain (TD=4).

Periodicity of each chain is obtained by modeling access to the transport resource as a periodic succession of fixed length timeslots in which a transaction is allowed access to an output channel at full capacity. Periodicity simplifies scheduling and stabilizes traffic variations resulting in stable network performance. The semi-transparency of each chain, resulting from periodic access to the channel, allows interleaving several flows using buffers to align the flows in time. With reference to FIG. 1, the transparency degree (TD) of a chain is defined as the period (expressed in number of timeslots) of the occupied slots in a periodic frame structure that represents capacity on a transport resource.

Figure 2:
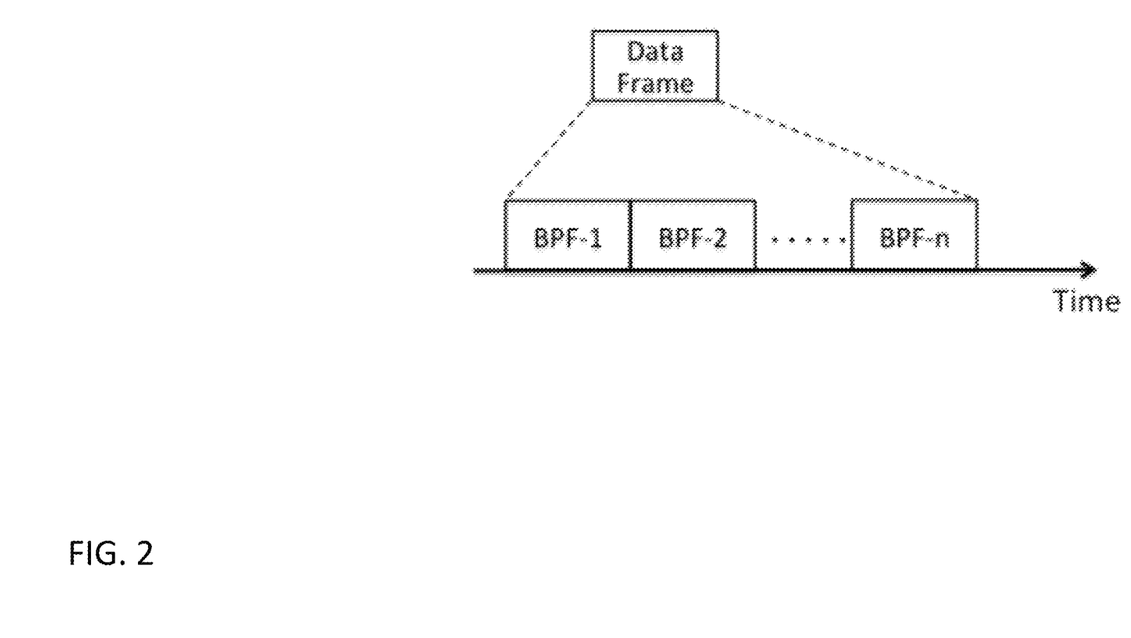
FIG. 2 illustrates a data frame assembled by multiple basic payload frames (BPFs).

Note that TD can be dynamically adapted based on the available BW, thus a cross-layer approach may be utilized. Furthermore, BFP differs from TDM systems in that timeslots are only used to model transport resources and regulate access on a per flow basis, and need not to be physically implemented in the underlying hardware. Another difference with TDM systems is that the timeslots in TDM are somehow rigid and each TDM channel occupies a fixed amount of the available bandwidth. In BFP the amount of bandwidth occupied is decided on a per-transaction basis, resulting in a more flexible bandwidth usage. Lastly, the size of the BFP timeslots can be adjusted by varying the size of the data frames. In each chain, the fixed-size data frames are comprised of an integer number of Basic Payload Frames (BPF) assembled back to back as shown in FIG. 2. Once a receiving node delineates a data frame consisting of one or more BPFs, it handles it as a single frame. This allows for the use of data frames of virtually any size.

Basic Void Frames (BVF) are also defined. BVF are equal in size to BPFs but carry only stuffing bits and are added at transmission time to fill the gaps between data frames according to the selected TD. Using BPF and BVF effectively allows setting up a TDM-like channel on the fly, targeted to the specific requirements of each transaction, which is automatically released when the transaction is completed.

Scheduling is the means by which contending requests are directed to transmit so as to minimize buffering required to efficiently pack the transport resource. Admission control is the process used to grant or deny permission to contend.

A network of fixed capacity links is presumed to have been provisioned interconnecting widely separated data centers and this capacity is accessed only by BFP. This deployed capacity may be in the form of dedicated transport capacity, whether this is Ethernet, Ethernet over OTN, or a mapping of BFP directly onto the OTN layer. The data frames fit naturally within the underlying transport capacity.

Figure 3:
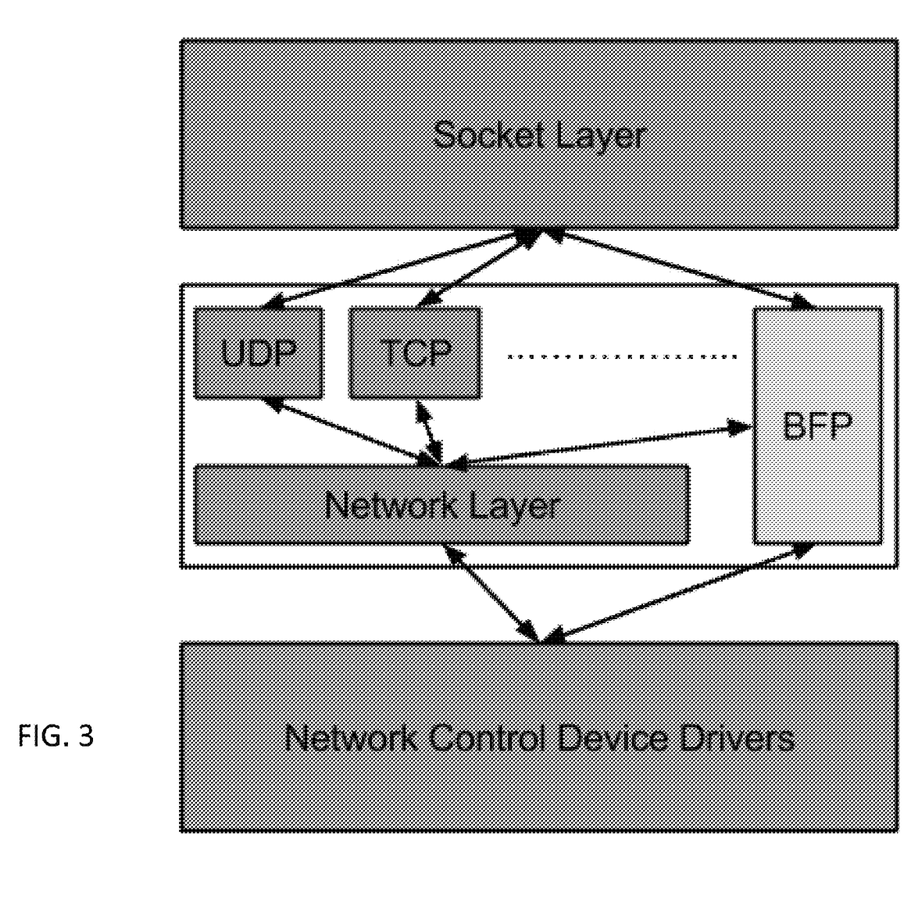
FIG. 3 illustrates integration of the proposed protocol in the current layered architecture.

Since BFP exploits a tight linkage between application and physical-layer resources, it can be described with reference to FIG. 3. Application programmers must see this as yet another variant of well-known socket-related actions, like TCP and UDP, as discussed later. But whereas TCP and UDP pass through IP before transport, BFP passes through a parallel path to transport. This path manages admission control, scheduling, and mapping into physical-layer resources, functions that may exploit information passed between nodes by TCP/IP.

IV. Admission Control and Scheduling

When a source is ready to transmit a chain, this is associated with a control packet (CP), which is sent over the data path whose propagation time is assumed to be known by the source node to reserve resources such as bandwidth and buffer space, using a two-way reservation protocol. Due to the periodic configuration of the data frames in a chain, a small CP can convey full information on chain configuration and timing, regardless of the amount of data transported by the chain. During the resource reservation phase the data sits at the source machine until confirmation (ACK) of successful reservation is received, avoiding unnecessary occupation of network resources. Many alternative approaches to scheduling are possible. A representative approach is described below that can be used to schedule chained data structures over an end-to-end path.

When a CP for the selected configuration (i.e. frame size, TD and number of data frames per file) is generated at the source node an Expected Time of Arrival (ETAsrc) parameter is computed according to the following Equation (1) and included in the CP.

$$\text{ETA}_{src} = \sum_{i=1}^{N} \tau_i + \sum_{j=1}^{N} p_j + \tau_{ack} \quad (1)$$

where:
N number of nodes in the path
$\tau_i$ propagation time to reach node i
$p_j$ estimated CP processing time for node i
$\tau_{ack}$ time for the ACK to reach the source node The ETA parameter communicates to each node in the path the delay between the reception of the CP and the arrival of the first bit of its relative chain. Each node uses ETA and chain configuration information to compute the buffering time (BT) to interleave an incoming chain with previously scheduled chains on the output channel, according to Equation 2. Before being forwarded to the next node, CP is updated with a new ETA information, computed according to Equation 3. This updated ETA value will be used by the next node in the path to schedule the chain.

$$BT_i = t_{e,1} - \text{ETA}_i \quad (2)$$

where:
$t_{e,1}$ ending time of the first available timeslot on the outgoing channel.

$$\text{ETA}_{i+1} = \text{ETA}_i + BT_i - p_i \quad (3)$$

Once the CP reaches the destination node, an acknowledgement (ACK) is generated and sent over the reverse path to the source node. Upon receiving the ACK, the source node is assured that resources are available to support the transaction and starts transmitting the data frames separated by a number of void frames (BVF) consistent with the selected TD. Using this procedure, each node in the path can reserve resources only for the time necessary for the chain to traverse it, optimizing resource utilization. Buffering can be used to align frames in time and to overcome any timing uncertainties. Therefore, timing precision required by the scheduling procedure should be manageable using standard ranging procedures.

V. Mapping onto Transport Layer

Also described herein is the mapping of the proposed protocol onto the transport layer after a brief review of Ethernet and OTN framing.

A. Mapping BFP onto Ethernet

Standard Ethernet frames bare a payload varying from a minimum of 42 bytes to 1500 bytes. This limitation is removed when jumbo frames are used, allowing up to 9000 bytes of payload. Each Ethernet frame has a preamble of 7 bytes, 1 byte of Start Frame Delimiter (SFD), 6 bytes for source MAC address and 6 for destination MAC address, a 4 byte Frame Check Sequence is also appended to the Ethernet frame. Furthermore, after each frame is sent, transmitters are should transmit a minimum of 12 bytes of Inter Frame Gap (IFG).

BPF and BVF can be mapped directly onto Ethernet frames by setting the size of BPF and BVF equal to the Ethernet frame payload size (e.g.: 9000 B), allowing the proposed protocol to be mapped onto an Ethernet transport layer. In this case, frame delineation is performed by the Ethernet frames and preamble or Inter Frame Gap (IFG) bits can be used to code frame-related information (e.g. frame number, frame type—BPF, BVF or CP— and data frame size). Note that in the 10GE case, only full-duplex mode is allowed, making the preamble bits unnecessary (10GE receivers ignore preamble bits) and allowing the use of these bits for other purposes, e.g. as proprietary OAM channels.

B. Mapping BFP onto OTN

ITU-T G.709 (OTN) provides bit and timing transparent transport services. Standard containers for any client signal available today are defined together with their relative mapping procedures. Furthermore, flexible containers (i.e. ODUflex) are defined in the G.709 transport hierarchy to support packet-based clients with a wide range of bitrates. Each OTN frame bares a payload of 15232 bytes over which one or more client signals are mapped. For cell or packet based clients OTN uses GFP to encapsulate data packets and generate a continuous stream of GFP frames which is then mapped in an octet-aligned manner directly onto the OPU payload area. In this case, rate adaptation is done using GFP idle frames, which are transmitted anytime there is no data to send.

For implementation of BFP over the OTN transport infrastructure, the general idea is to reserve an ODU channel over each link of a network to build an overlay network which is then used exclusively to handle BFP transactions. In some embodiments, the portion of dedicated bandwidth is flexible. To achieve this flexibility without using cumbersome control plane operations, setting up ODUflex channels for each link of the overlay network seems the best option as these channels can be resized without tearing down and re-establishing the connection via the Hitless Adjustment of ODUflex protocol. The configuration of the overlay network (topology and capacities of each link) should be relatively stable (time-wise) and only occasional changes will be needed. Such changes can be planned offline over coarse timescales. Once the overlay has been established, each chain is built by mapping BPF and BVF onto GFP frames, and GFP Extension Header is used to code frame-related information. The resulting stream of GFP frames is then mapped onto the payload area of the ODUflex (i.e. ODUflex (GFP)) signal in an octet-aligned manner. Frame delineation is left to GFP and any eventual rate adaptation is performed using GFP idle frames.

C. Routing

Since the proposed approach provides a methodology separate from IP for end-to-end data transmission, a way to route chains from source to destination through a network can be used. Although routing and load balancing algorithms can be specifically designed for the disclosed methods, taking into account the periodic configuration of the proposed transport structure, it is also possible to simply re-use protocols that are already in place. In the following a method to reuse deployed routing protocols is discussed.

As the CP travels through each node an association between input port and output port traversed by the CP is built and stored locally in a table at each node. The assumption here is that both CP and data chain will go through the same ports in both the forward and backward direction. This port mapping is based on the particular routing protocol implemented at each specific node and the routing information is only accessed when the CP is processed avoiding any header lookup operations on the data frames of each chain. Data frames of each chain are easily identified using the TD information (periodicity) combined with the ETA parameter carried by the relative CP, and are simply delayed by an amount of time equal to the Buffering Time (which is the same for each frame of the same chain) before being switched to the output port indicated by the aforementioned table without further processing. In this respect the periodicity of each chain can be thought as an "embedded Forwarding Equivalence Class'"(e-FEC) relative to all the frames in a chain. Each table entry is relative to a specific chain and is stored in the table until the chain traverses the node. The size of this table depends on both on the number of transactions each node is able to handle and on the average duration of each reservation procedure. Although the size of the table may become cumbersome the assumption here is that large transactions are relatively infrequent and the reservation procedure is fast enough to keep the size manageable.

D. Application Programming Interface

In some embodiments, the protocol can be installed in the network stack in a way that provides a certain level of familiarity for the application developers. That is, an application developer, given the drive to use the protocol and the familiarity with the usage of network sockets, should be able to undertake the well-known and common socket related actions—such as creating, connecting, listening, sending, receiving, etc.—in a way that is not much different from the actions that are involved in programming with TCP or UDP sockets. The proposed protocol can be registered with the socket layer, can be easily accessed by just using an indicator that will point to the newly registered protocol upon socket creation, and the functionality is provided with identical function headers. In the same sense, the structural similarities will also have a positive impact on incorporating the proposed protocol with software packages that abstract the socket layer.

Fortunately, the installation options already exist in the Linux Kernel. The proposed BFP can be registered with the socket layer as a new transport layer protocol making it appear to the application developers and the abstraction packages as just another protocol like TCP and UDP, hence, hiding the cross-layer behavior of the proposed protocol at the lower layers (See FIG. 3 Furthermore, implementation of the proposed protocol in the form of a loadable kernel module (LKM) will ensure that the kernel patches, hence possible regressions, are avoided, and the new protocol can be unloaded upon request. This approach also ensures that the deployment is relatively easy from the network administrators' point of view.

E. Hardware Implementation:

Fortunately, the installation options already exist in the Linux Kernel. An exemplary BFP (FIG. 10) shows how BFP functionalities can be integrated into an OTN-enabled NIC card. Incoming optical signals (OTUk) are converted into electronic format and processed by the OTN processor (block 1000) before being passed to the Fabric Interface Chip (FIC, block 1002) as packets. Here BFP traffic is separated from non-BFP traffic. BFP Control Packets (CP) are processed and information about configuration and timing of their relative chains is used by the FIC to schedule buffer space and switching resources for the data chains. CP source and destination addresses are passed to the routing layer through the Routing Layer Interface (block 1004) which communicates with whichever routing protocol is available and presents the FIC with an input-port-to-output-port mapping relative to the addresses provided. This information is used by the FIC to populate a table (referred to as the port-map table), which contains the binding of input-to-output ports for each chain.

Figure 10:
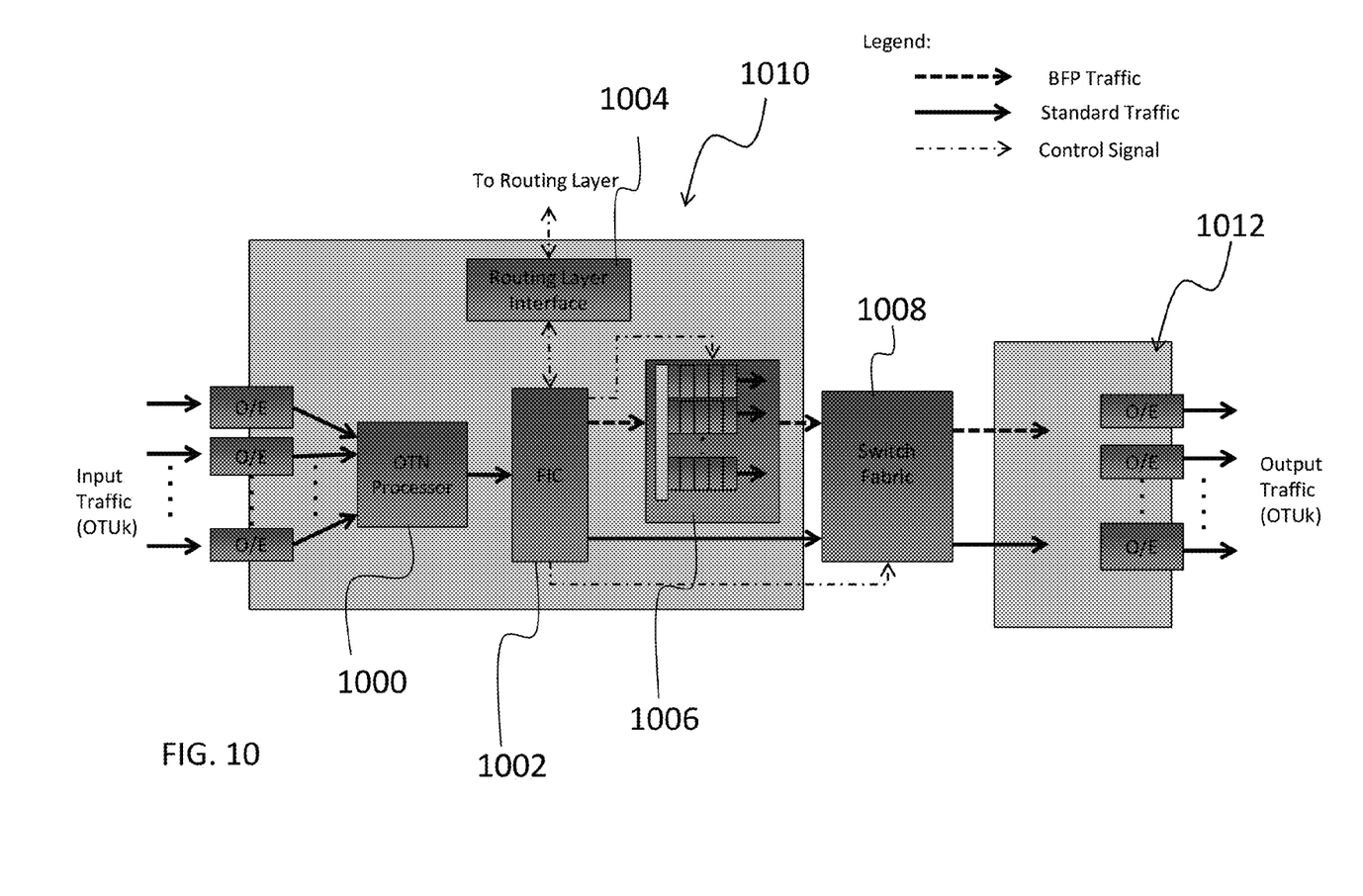
FIG. 10 is a schematic diagram of a representative optical transport network (OTN) switch modified to support a big file protocol (BFP).

Data frames from each chain are routed through a buffering stage (block 1006) to be delayed by an amount of time consistent with the buffering time (BT) computed for each chain. At the output of the buffering stage, chains can be sent to their respective output ports through the switch fabric. Chains going through the same ports will naturally interleave with one another.

Functional blocks of the input NIC (block 1010) are described below.

OTN Processor, Block 1000:
1. Extracts ODUk signals from the input OTUk signals
2. Packetizes ODUk signals
3. Passes packetized ODUk signals to the FIC Fabric Interface Chip (FIC), Block 1002:
1. Separates BFP traffic from standard traffic (i.e. non-BFP traffic)
2. Processes Control Packets and computes Buffering Time (BT) for each chain
3. Controls the BFP buffering stage (block 1006) by setting up the BT for each incoming chain in advance
4. Requests routing information to the routing layer through the Routing Layer Interface (block 1004)
5. Upon receiving routing information from block 1004 schedules switching resources for incoming chains
6. Populates and updates the port-map table with the routing information obtained from the routing layer
7. Routes incoming chain data frames towards the BFP buffer stage (block 1006)
8. Performs standard FIC functions for non-BFP traffic Routing Layer Interface, Block 1004:
1. Interfaces with various routing protocols and provides the FIC with the information used to build the port-map table BFP Buffering Stage, Block 1006:
1. Delays frames of an incoming chain by the amount indicated from the BT
2. Pass outgoing chain frames to the switch fabric Switch Fabric, Block 1008:
3. Performs switching operations for BFP traffic and non-BFP traffic Output NIC, Block 1012:
1. Maps incoming packets/frames onto OTUk signals and transmits them onto the optical mesh.

Figure 11:
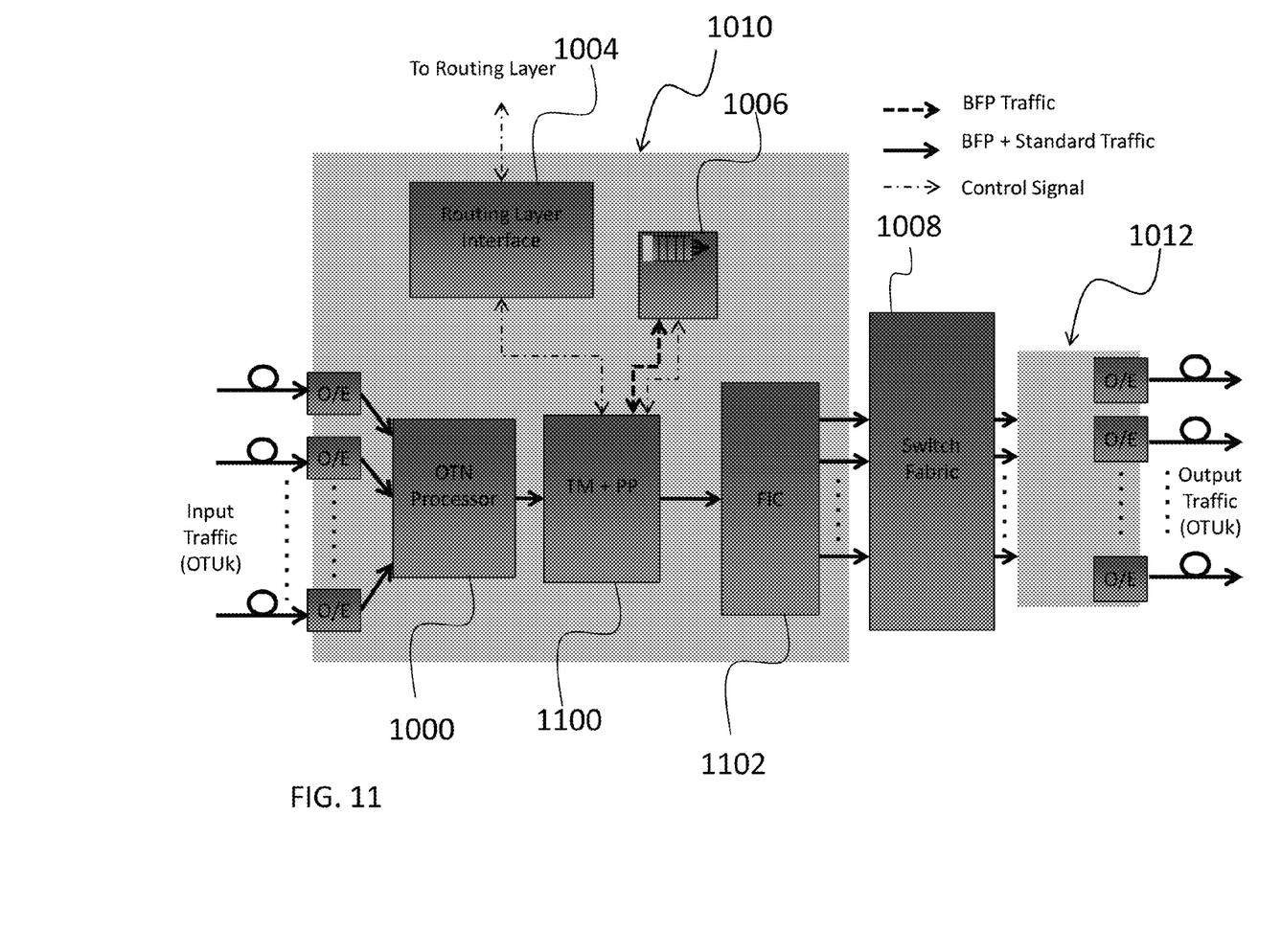
FIG. 11 is a schematic diagram of another representative optical transport network (OTN) switch modified to support a big file protocol (BFP).

Block 1002 can also be implemented with two separate blocks as is illustrated in FIG. 11, namely: FIC (1102, FIG. 11) and Traffic Manager and Packet Processor (1100, FIG. 11), whose functionalities are as follows:

Traffic manager (TM)+packet processor (PP) (illustrated as block 1100 in FIG. 11): the traffic manager separates BFP traffic (control and data) from standard traffic (i.e., non-BFP traffic). CPs are processed in this block and BT is computed for each incoming chain in advance. Based on the source and destination addresses carried by the CP, this block requests routing information to the routing layer through the routing layer interface (1004, FIG. 11). Upon receiving routing information, the TM schedules switching resources and reserves buffer space (in advance) for incoming chains. The TM also populates/updates the port-map table with the newly obtained routing information. When BFP data frames (i.e., chains) arrive at the TM, these are routed to the buffer stage (1006, FIG. 11), where each data frame is delayed by an amount of time consistent with its relative BT before being routed toward the FIC (1102, FIG. 11).

The functionalities of the Fabric Interface Chip (FIC, 1002 of FIG. 10/1102 FIG. 11) usually involve the following: Fabric interface chip (FIC, 1002 of FIG. 10/1102 FIG. 11)—this block performs standard FIC functions (i.e., traffic adaptation and congestion control) for both BFP and non-BFP traffic.

VI. Examples

Figure 4:
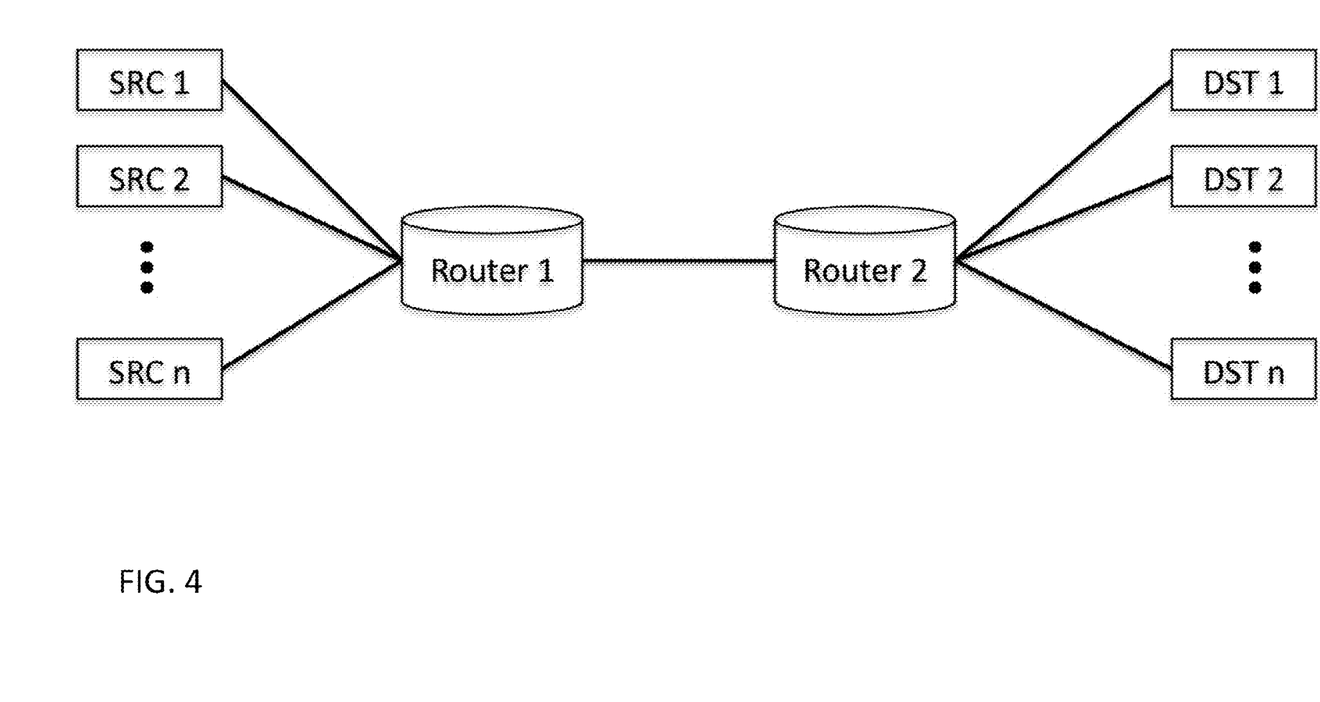
FIG. 4 illustrates a simulation topology embodiment.

In this exemplary embodiment, the ability to efficiently handle bulk data transfers of the disclosed method was evaluated in comparison to that of TCP Westwood, a high-speed version of TCP currently implemented in the Linux kernel. All simulations were run using Omnet++ discrete event simulation tool. The two approaches are compared in terms of goodput, end-to end delay and average buffer size. A dumbbell topology (FIG. 4) was selected for this example. The propagation delay for each link is set to 1 mS giving a RTT of roughly 6 mS. Bitrate was set to 10 Gb/s for all links. With reference to FIG. 1, the size of each data frame is set to be one BPF, and the same size is selected for the voids (i.e. one void is comprised of a single BVF) for all BFP cases. Transactions varying in size from 500 kB to 1 GB were considered and each transmission repeated until statistical stability is reached.

To model the time interval between two consecutive transactions (for both TCP and BFP) the system was studied using both an exponential distribution with mean $\mu=1$ mS and a generalized Pareto distribution with scale parameter $\sigma=0.0003$ and shape parameter $\xi=2$. The latter case was selected to test the protocols with a more realistic traffic pattern. However, results did not show significant differences between the two distributions for the performance parameters considered (due to space constraints only results for exponential inter-arrival times are reported). For the BFP over OTN case, each OTN frame carries 15222B of payload, corresponding to the payload area of the OTN frame minus the GFP overhead including core, payload header, and two bytes of the extended header which are used as a binary counter to number each frame in a chain, allowing a maximum size for the bulk data carried in a chain of roughly 1 GB. An Ethernet jumbo frame with 9000B of payload was selected as the basic payload frame for the BFP over Ethernet case. A TD of 8 was used for all BFP cases and a maximum buffer size of 12 frames (TD+4) was selected for both BFP cases. This is not a strict requirement and can be relaxed by trading buffer space for higher utilization and lower CP blocking probability. For the TCP simulation a MSS of 8960B was selected and the layer 2 MTU was set to 9000B (Ethernet jumbo frame). A RED queuing discipline was used in each router, with: queue weight $q_w=0.002$, minimum threshold $min_{th}=5$ packets, maximum threshold $max_{th}=50$ packets and maximum packet marking probability $max_{pb}=0.02$.

A. Goodput

Figure 5:
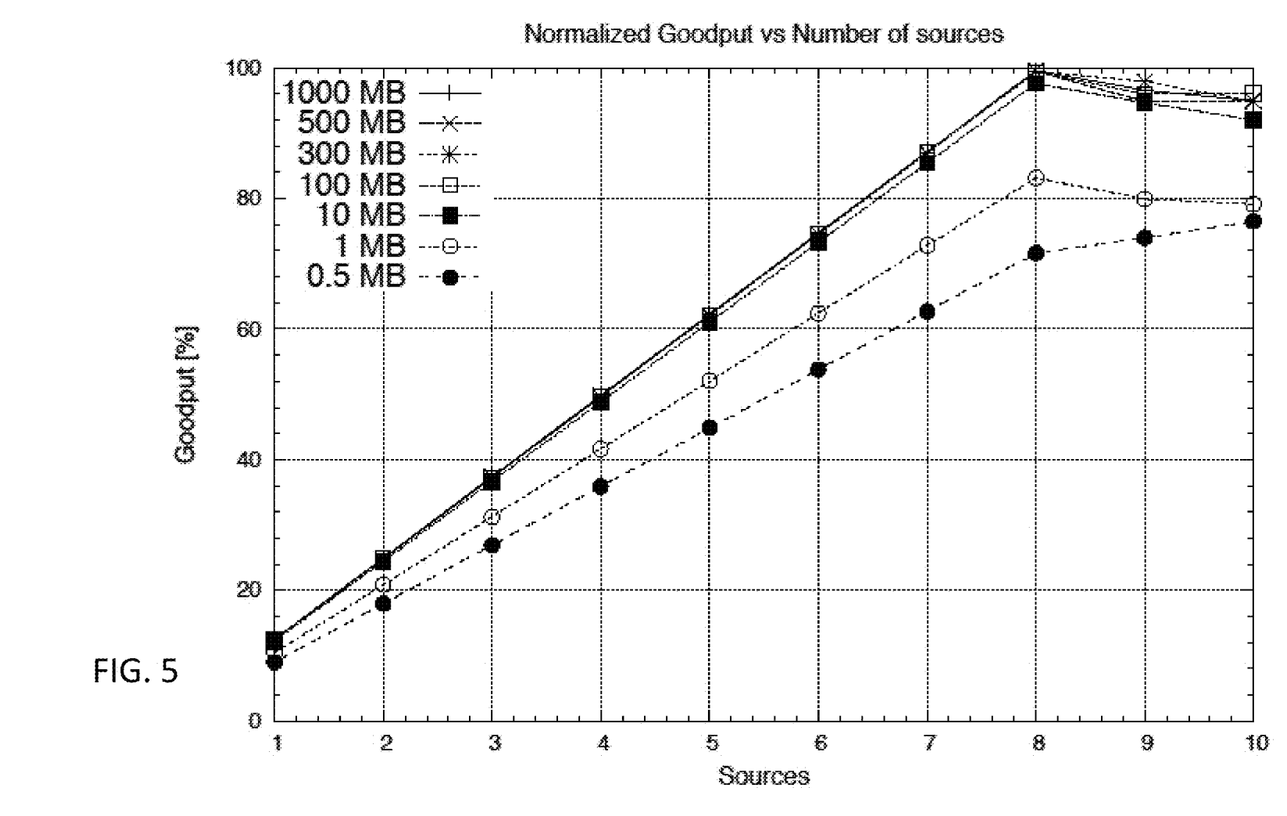
FIG. 5 is a graph of normalized goodput for BFP over Ethernet.
Figure 6:
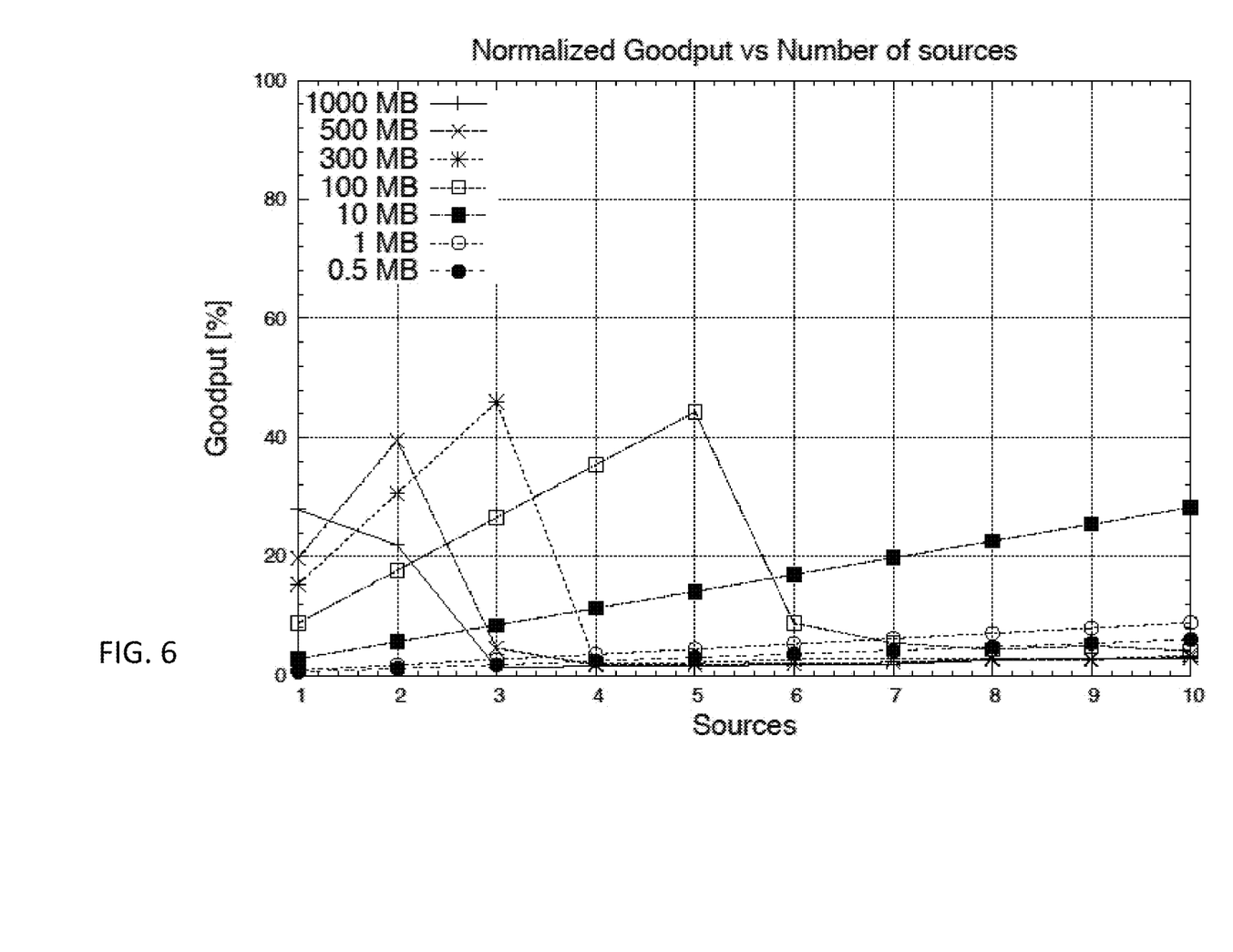
FIG. 6 is a graph of normalized goodput for TCP.

Instead of considering link utilization (which could be misleading, especially in the TCP case) the goodput normalized to the maximum link capacity was considered to measure the amount of payload per unit of time each approach is able to correctly deliver and the amount of bandwidth used to transfer the data payload. Protocol overhead was excluded since this is not part of the payload. FIGS. 5 and 6 show the average normalized goodput for BFP over Ethernet and TCP respectively. Performance of BFP over OTN were also studied. Results show nearly identical performance of BFP over OTN and over Ethernet. Due to space constraints only the latter is shown here.

For transaction sizes>10 MB, it was determined that in both BFP cases goodput increases linearly up to roughly 99% (reached when the number of sources equals the TD). This is the result of scheduled interleaving of chained data which gives a goodput close to 100% with CP blocking occurring only when normalized goodput is close to its maximum. Beyond this point goodput remains above 70% for both the BFP cases and all transaction sizes considered. Note that with BFP, small transactions (≤10 MB) can achieve high link utilization due to interleaving of flows coming from different sources.

Figure 7:
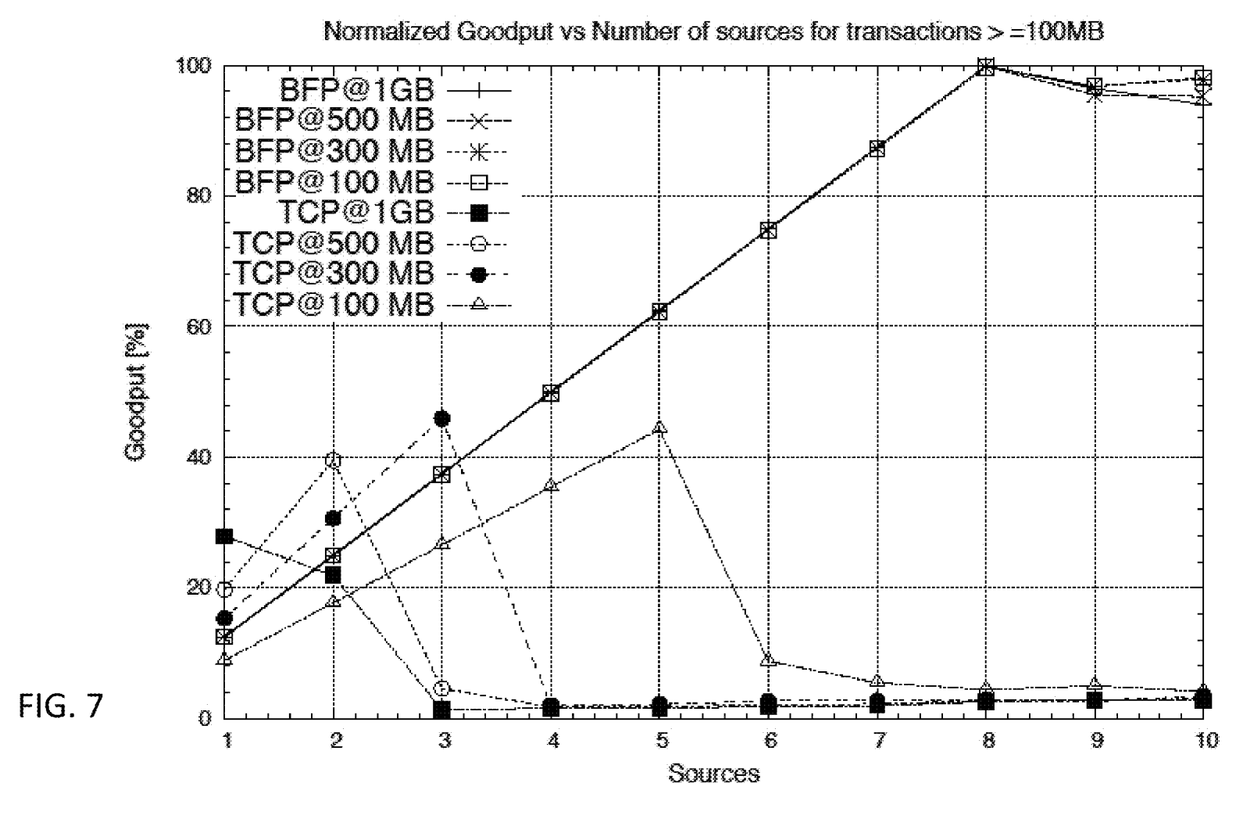
FIG. 7 is a graph of normalized goodput for transactions≥100 MB.

In the TCP case, each source tends to fill the entire bandwidth of their link to the bottleneck router which gives higher goodput with respect to the BFP case for long lived TCP flows (≥300 MB) as long as the number of sources remains limited (≤3). For shorter flows (transaction size≤100 MB) TCP either does not ramp up fast enough to fill the available bandwidth or, as the number of sources increases, TCP is prone to packet drops which trigger the TCP backoff algorithm, reducing the offered load from the TCP sources and resulting in poor link utilization. Another issue with multiple TCP sources competing for the same resources, common in data center environments, is TCP incast, which leads to throughput collapse. While this phenomenon was observed in some examples for the TCP case it did not occur in the BFP case. FIG. 7 shows a comparison of normalized goodput between BFP and TCP for transaction sizes≥100 MB. The rapid goodput collapse observed for large transactions (≥100 MB) in TCP as the number of sources increase suggest a significant advantage relative to the amount of offered load that BFP can handle with respect to TCP. BFP can accommodate over 40% more load with respect to TCP without incurring goodput collapse.

B. Delay

Figure 8:
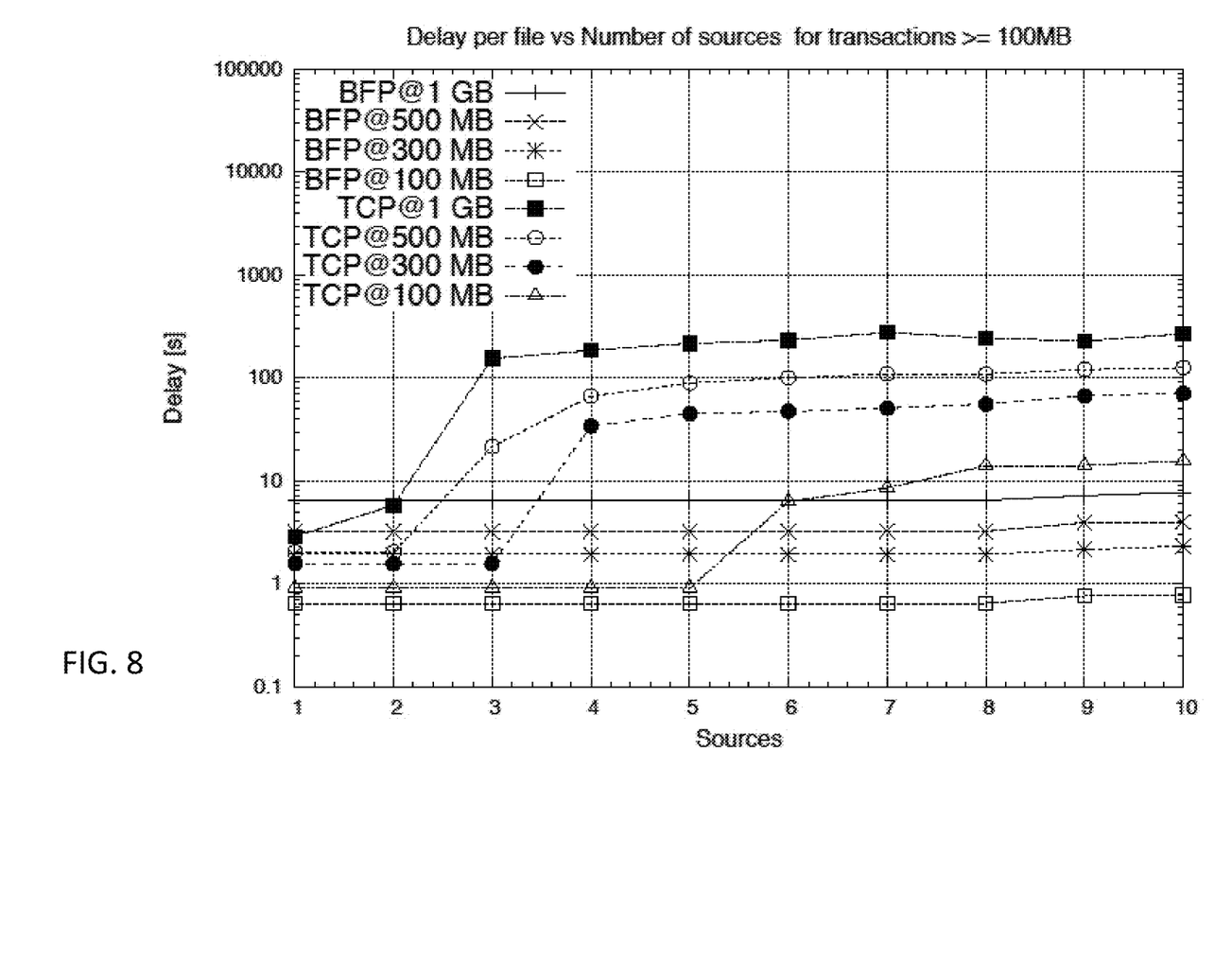
FIG. 8 is a graph of delay per transaction for transactions≥100 MB.

As a measure of the delay performance, the average time needed to successfully complete one transaction was selected, including the time needed to setup the connection and any data retransmission. A new connection is setup for each new transaction. A comparison of the end-to-end delay performance for transactions≥100 MB is shown in FIG. 8. For transactions≥500 MB and up to 2 sources TCP tends to fill the available bandwidth and achieves smaller delays. As the number of sources increase, TCP goodput collapses (see FIG. 6) and end-to-end delay rapidly increases to values up to over 30 times larger than BFP. Similar performance can be seen for all other transaction sizes (e.g. 300 MB and 100 MB), although in these cases BFP achieves better delay performances over the entire range considered. The rapid degradation of delay performance of TCP is due to the high packet drop rate occurring when multiple sources compete for the same resources as well as to the large number of acknowledgements (ACK) used by TCP. Although in the topology studied the Round Trip Time (RTT) is relatively small, the effect of ACKs transmission has a heavy influence on TCP delay performance (each ACK will add to the overall delay an amount proportional to RTT=2). Delay will further degrade in the TCP case as the network diameter increases. This would also happen in the BFP case but to a much smaller degree due to the much smaller amount of control information exchanged between source and destination.

Figure 9:
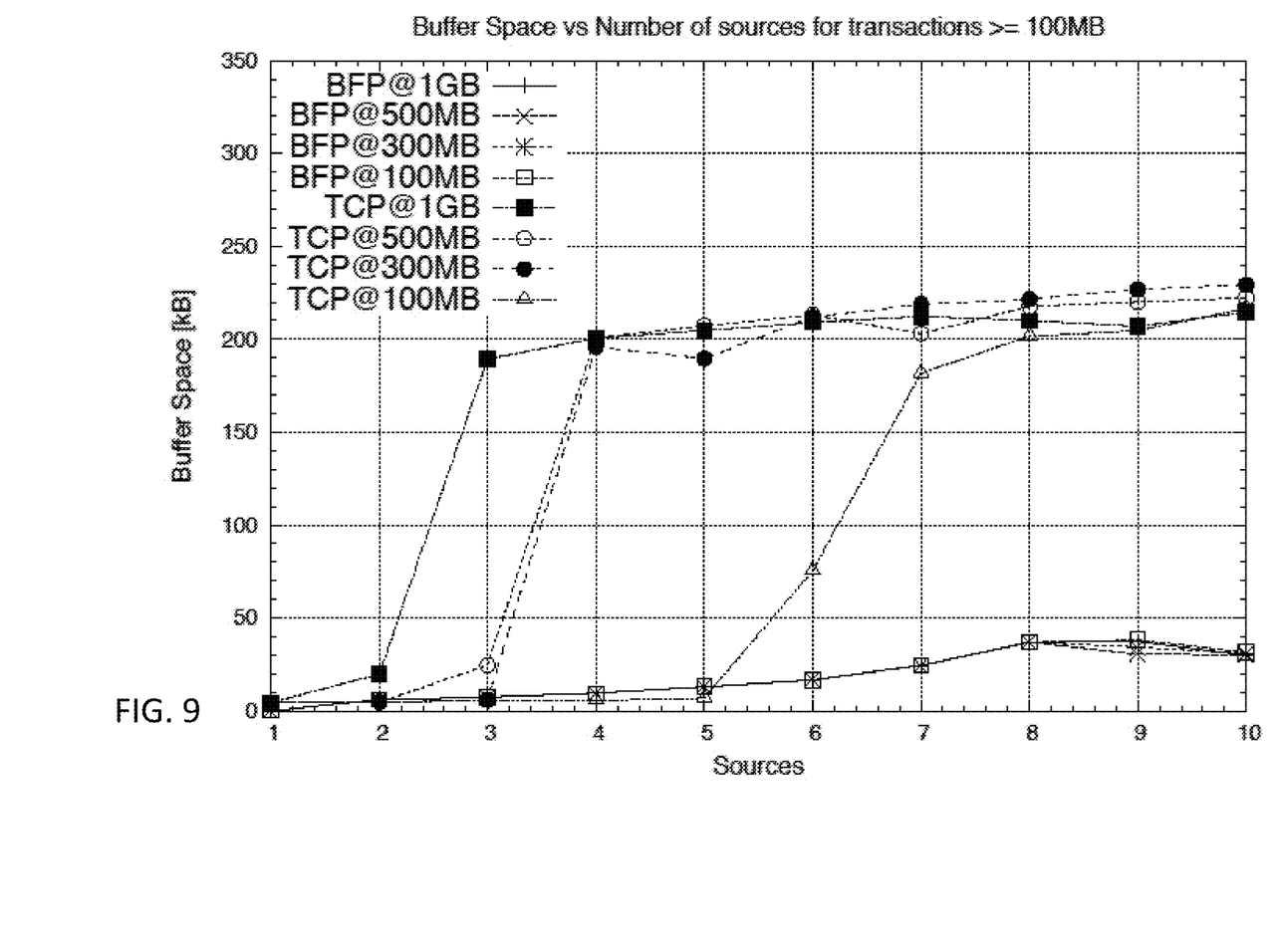
FIG. 9 is a graph of average buffer size for transactions≥100 MB.

The particular buffering technique used by BFP also improves delay performance with respect to TCP by reducing the queuing delays when the network is congested (See FIG. 9). Lastly, due to the periodic configuration of data frames in each BFP transaction, the variation of the end-to-end delay over the entire range considered is much smaller for BFP, resulting in more stable delay performance of BFP over TCP.

C. Buffer Size

FIG. 9 shows a comparison of the average buffer space utilized by BFP and TCP for transactions≥100 MB. Average buffer size for BFP is proportional to the BFP frame size and the selected TD, resulting in stable and predictable buffer occupancy in any load condition. The random nature of TCP packet arrival will tend to fill the buffer quickly as congestion approaches. FIG. 9 shows that for a transaction size of 1 GB, buffer size grows rapidly to values several times larger than in the BFP case when more than 2 TCP sources compete for the same bottleneck link. Similar performance is observed for other transaction sizes. Lastly, since BFP uses buffer to delay each incoming chain in order to interleave it with previously booked chains, the maximum buffer size for BFP is a function of the chains configuration rather than of the network load, and can therefore be tightly controlled.

The present disclosure concerns a BFP, a network protocol designed to efficiently handle large transactions over the existing network infrastructure. Using BFP, large file transactions are handled at lower layers (e.g. L1 and L2). Higher layers are accessed only when needed with routing functionalities that are only used during connection setup and not for every single data frame as in TCP. Scheduling allows BFP to accommodate network loads over 40% higher with respect to TCP without incurring goodput collapse and achieving goodput values close to 100%.

Stable end-to-end delay performance is also achieved, with values over 30 times smaller with respect to TCP. Buffer occupancy of BFP in congested scenarios is predictable and much smaller relative to TCP. The results presented show the potential of BFP to achieve better use of the deployed capacity, potentially resulting in significant cost savings for the network operators in both transport and data center environments.

In view of the many possible embodiments to which the principles of the present disclosure may be applied, it should be recognized that the illustrated embodiments are only preferred examples of the present disclosure and should not be taken as limiting the scope of the present disclosure. Rather, the scope of the present disclosure is defined by the following claims. We therefore claim all that comes within the scope and spirit of these claims.

We claim:

1. A method for transporting a data file, comprising:
   dividing the data file into a plurality of data frames;
   concatenating the plurality of data frames into at least one chain with a predefined transparency degree;
   associating the at least one chain with a control packet comprising information regarding at least a chain length of the at least one chain and the predefined transparency degree;
   scheduling transmission of the at least one chain along a predetermined path of a network based on the control packet; and
   transmitting each data frame along the predetermined path at a time derived from an expected time of arrival parameter.

2. The method of claim 1, further comprising concatenating the plurality of data frames into the at least one chain with one or more void frames.

3. The method of claim 1, wherein dividing the data file into a plurality of data frames comprises selecting a data frame size matching that of a transport layer.

4. The method of claim 1, further comprising using a buffer having a buffer size proportional to a data frame size and a transparency degree to delay the at least one chain so as to interleave the at least one chain with a previously received chain or an incoming chain.

5. The method of claim 4, wherein a maximum buffer size is selected based on a maximum data frame size and a maximum transparency degree of the at least one chain.

6. The method of claim 1, wherein the data file has a size of at least 100 MB.

7. The method of claim 1, wherein the predefined transparency degree of the at least one chain is associated with a number of periods of the at least one chain having at least one timeslot occupied by at least one data frame.

8. The method of claim 1, wherein the predefined transparency degree is associated with a number of void frames in the at least one chain.

9. The method of claim 1, wherein the expected time of arrival parameter is included in the control packet and is communicated to at least one node of the predetermined path and is associated with a delay between control packet arrival and chain reception commencement.

10. A system for transporting a data file, comprising at least one source server comprising a software module configured to:
   divide the data file into a plurality of data frames;
   concatenate the plurality of data frames into at least one chain with a predefined transparency degree;
   associate the at least one chain with a control packet comprising information regarding at least a chain length of the at least one chain and the predefined transparency degree;
   schedule transmission of the at least one chain along a predetermined path of a network based on the control packet; and
   transmit each data frame along the predetermined path at a time derived from an expected time of arrival parameter.

11. The system of claim 10, wherein the at least one chain further comprises one or more void frames.

12. The system of claim 10, wherein the plurality of data frames comprises data frames of different sizes.

13. The system of claim 10, wherein the predefined transparency degree of the at least one chain is associated with a number of periods of the at least one chain comprising at least one timeslot occupied by at least one data frame.

14. The system of claim 10, wherein the predefined transparency degree of the at least one chain is associated with a number of void frames in the at least one chain.

15. The system of claim 10, wherein the expected time of arrival parameter is included in the control packet and is communicated to at least one node of the predetermined path and is associated with a delay between control packet arrival and chain reception commencement.

16. The system of claim 10, wherein the system includes a network interface that communicates the at least one chain and wherein the network interface is an optical transport network or an Ethernet-based network.

* * * * *